United States Patent
Navarro et al.

(10) Patent No.: US 9,687,974 B2
(45) Date of Patent: Jun. 27, 2017

(54) OVERSIZE BEARING RETROFIT USING INTERNAL WIRE LOCK AND INSTALLATION TOOL/METHOD FOR INSTALLATION

(71) Applicant: IMS SOLUTION, Watkinsville, GA (US)

(72) Inventors: Charles Lauren Navarro, Momence, IL (US); Jacob Dean Raby, Cleveland, GA (US)

(73) Assignee: IMS SOLUTION

( * ) Notice: Subject to any disclaimer, the term of this patent is extended or adjusted under 35 U.S.C. 154(b) by 330 days.

(21) Appl. No.: 14/531,605

(22) Filed: Nov. 3, 2014

(65) Prior Publication Data

US 2015/0121697 A1     May 7, 2015

Related U.S. Application Data

(60) Provisional application No. 61/899,174, filed on Nov. 2, 2013.

(51) Int. Cl.
*B25B 27/00* (2006.01)
*B25B 27/06* (2006.01)
*B23P 6/00* (2006.01)

(52) U.S. Cl.
CPC ........ *B25B 27/0035* (2013.01); *B25B 27/062* (2013.01); *B23P 6/00* (2013.01); *Y10T 29/49233* (2015.01); *Y10T 29/53961* (2015.01)

(58) Field of Classification Search
CPC .............. B25B 27/0035; B25B 27/062; Y10T 29/49233; Y10T 29/53961; B23P 6/00
See application file for complete search history.

(56) References Cited

U.S. PATENT DOCUMENTS

| | | | | |
|---|---|---|---|---|
| 4,434,588 A | * | 3/1984 | Wada | B24B 33/083 451/462 |
| 4,894,899 A | * | 1/1990 | Hamatani | B25B 27/062 29/252 |
| 4,979,850 A | * | 12/1990 | Dompe | B23B 29/02 408/241 S |
| 5,033,177 A | * | 7/1991 | Gathright | B25B 27/062 29/264 |
| 5,709,018 A | * | 1/1998 | Dugan | B23P 19/084 29/235 |

(Continued)

*Primary Examiner* — Richard Chang
(74) *Attorney, Agent, or Firm* — Mitch Harris, Atty at Law, LLC; Andrew M. Harris (57) ABSTRACT

A tool for installing a retrofit bearing having a length that extends beyond the original location of a tapered sleeve used to secure an original bearing and a method of performing the installation provide a reliable way to replace an engine bearing that supports and extends within a shaft end. The tool includes a flange with holes matching the engine block, a body coupled to the flange for accepting the captive portion of the replacement bearing, and a tapered sleeve disposed within the tool body for compressing a wire lock engaged with a mating channel of the replacement bearing when the captive portion is in the tool. The tapered sleeve has a diameter that mates with an inside diameter of an end of the engine shaft, so that the wire lock remains compressed until it engages with the channel provided in the engine shaft for the original snap ring.

20 Claims, 6 Drawing Sheets

(56) References Cited

U.S. PATENT DOCUMENTS

| | | | |
|---|---|---|---|
| 8,484,842 B2* | 7/2013 | Dickerson | B25B 27/0035 29/239 |
| 9,410,472 B2* | 8/2016 | Gacka | F01P 5/12 |
| 2011/0197846 A1* | 8/2011 | Shinomiya | F01M 1/20 123/196 R |

* cited by examiner

OVERSIZE BEARING RETROFIT USING INTERNAL WIRE LOCK AND INSTALLATION TOOL/METHOD FOR INSTALLATION

This U.S. patent application claims priority under 35 U.S.C. §119 to U.S. Provisional Patent Application Ser. No. 61/899,174 filed on Nov. 2, 2013.

BACKGROUND OF THE INVENTION

1. Field of the Invention

The present invention relates generally to engine refit tools, and more specifically, to techniques and tools for installing a retrofit bearing using a wire lock.

2. Background of the Invention

In some instances it is desirable to replace a bearing or other engine component with a component of improved design. In order to produce an improved performance/reliability in a newer version of the design, the improved component may not fit within the same volume as the original bearing. However, there may be sufficient volume in the installation location to permit the installation of the improved component.

For captive installation of a portion of a component, such as a bearing, a captive portion is inserted in the receiving volume and then locked in place with a retaining device. In retrofit installations such as that described above, if the volume of the improved component extends beyond the volume previously occupied by the captive portion, the captive portion of the improved component may interfere with, or prevent installation of the retaining device.

Therefore, it is desirable to provide improved engine components, along with methods and tools for their installation, that can replace captive components, while providing for additional volume of the captive portion of the component.

SUMMARY OF THE INVENTION

The invention is embodied in a method and tool for retrofitting an engine bearing having a captive portion and secured with a retaining device with a replacement bearing having a captive portion with a length that extends beyond the location of the retaining component in the original installation, along with an engine as retrofitted with the replacement bearing. The method is a method of using the tool to install the replacement bearing in the engine. The tool can also be used to extract the original bearing.

The tool includes a flange that has a hole pattern matching a hole pattern of an external face of a design of a block of the engine, a tool body coupled to the flange for accepting the captive portion of the replacement bearing and a tapered sleeve disposed within the tool body for compressing a retaining component engaged with a mating channel of the replacement bearing when the captive portion of the replacement bearing is installed in the tool. The tapered has a diameter adapted for mating with an inside diameter of an end of an engine shaft that receives the captive portion of the bearing after installation of the first engine component.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention includes tools and methods for installing captive portions of retro-fit bearing assemblies having a length greater than the original captive portion of the bearing. Since the retro-fit bearing captive portion is longer, the channel that receives the retaining component, e.g., a snap ring, is blocked by the longer captive portion of the new bearing. The present invention provides a tool and installation method that permit another retaining device, such as a wire lock, to be pre-installed in a groove in the captive portion of the new bearing with a tapered sleeve of the tool compressing the retaining device until the captive portion of the new bearing is extended into place, at which time the retaining device expands at least partially into the original channel that received the snap ring in the original installation. The installation can be performed with the vehicle in the engine, or removed from the engine. The installation tool includes a flange that is bolted to an exterior surface of the engine, such as the bell housing, and a body for retaining the replacement bearing, or accepting the original bearing when the tool is used for extraction. The tapered sleeve is used to compress the retaining device around the retro-fit bearing and is sized to maintain the compression until the retro-fit bearing slides into the end of the engine component into which it is being inserted. The tapered sleeve can be rotated 180° so that the tapered end faces away from the engine in order to use the tool to extract an original bearing.

Figure 1:
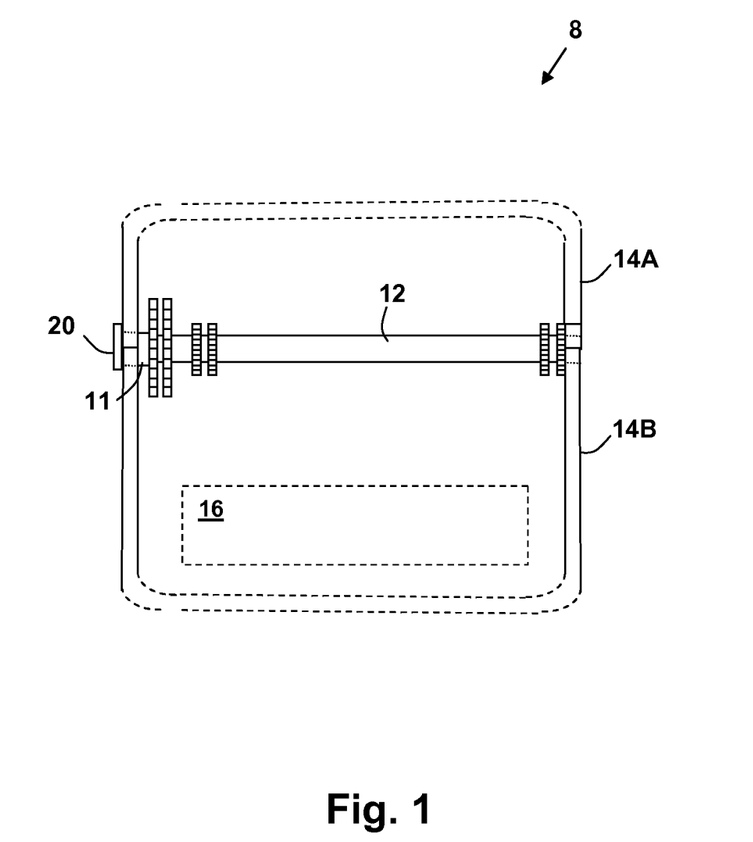
FIG. 1 is top view of an engine 8 showing a location of a retrofit installation with an oversized bearing 20 in accordance with an embodiment of the invention.

FIG. 1 is a simplified diagram of an engine block 8 with an upper block portion 14A and a lower block portion 14B. A crankcase module 16 is installed in lower cover portion 14B. Pistons, valves and rods are not shown for simplicity, as the exemplary layshaft end bearing retrofit relates to the end of a layshaft 12, sometimes referred to as an intermediate shaft, at which a stock ball-bearing 10 as described below with reference to FIGS. 2A-2B was previously installed, and is being replaced with a replacement bearing assembly 20 in accordance with the present invention. However, techniques according to the present invention may be applied in other circumstances and designs in which it is desirable to replace a bearing with a bearing having increased length, strength or load-bearing capacity, or other modifications requiring application of some or all of the techniques disclosed herein. A sleeve end 11 is formed on layshaft 12, which includes various sprockets and/or gears for operating camshaft drive chains and coupling layshaft 12 to a crankshaft within crankcase module 16. Sleeve end 11 includes a recess for accepting a journal portion of bearing assembly 10, forming the sleeve. Replacement bearing 20 shown in FIG. 1 has the advantage of high reliability and increased load-bearing capacity over a single-row ball bearing as it includes a dual-row ball bearing.

Figure 2A:
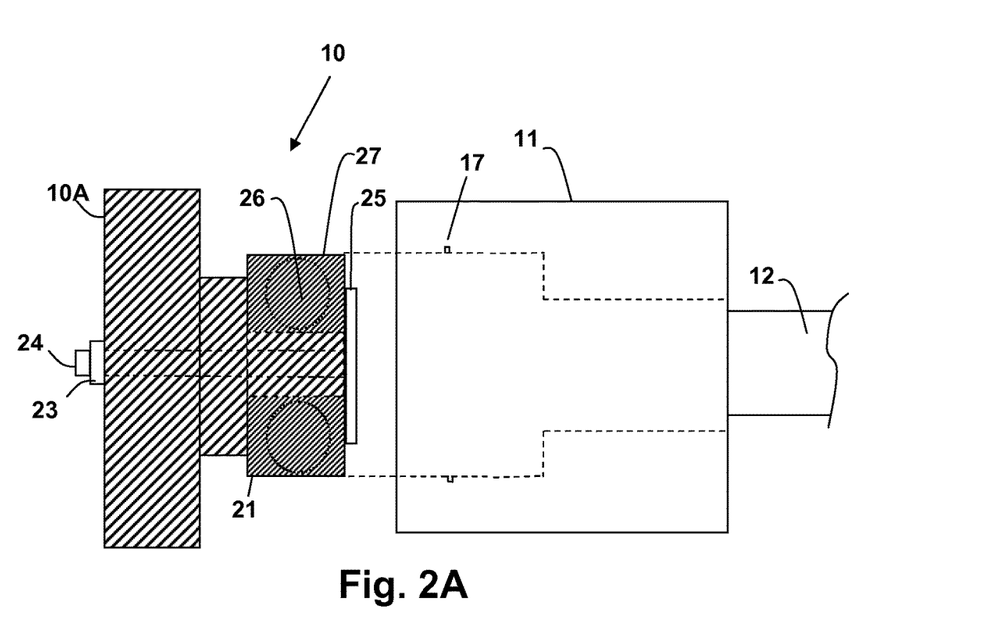
FIGS. 2A-2B are side cross-section views of a stock engine bearing 10 that can be replaced by a bearing in accordance with an embodiment of the invention.

Referring now to FIG. 2A, details of stock bearing assembly 10 are shown. For clarity, bearing assembly 10 is shown outside of sleeve end 11 of layshaft 12. Bearing assembly 10 includes a flange portion 10A that bolts to an external surface of engine block 8 via mounting bolts through holes in flange portion 10A (not shown). A cage 27 of a ball-bearing 21 containing balls 26 is dimensioned to fit within sleeve end 11 of layshaft 12. A groove 17 within sleeve end 11 is used to lock ball-bearing 21 within sleeve end 11 using a snap ring that provides a retaining component, so that the entirety of cage 27, i.e., the captive portion of stock bearing assembly 10 is captured within sleeve end 11 to the right of groove 17 in the Figure. In order to accomplish the installation, flange portion 10A is removable by removing a nut 23 that secures flange portion 10A to a threaded stud 24 that extends from a cap 25. Cap 25 and ball-bearing 21 are assembled and inserted in sleeve end 11, then the remainder of bearing assembly 10 is attached to ball-bearing 21 by nut 23, which is fastened to threaded stud 24.

Figure 2B:
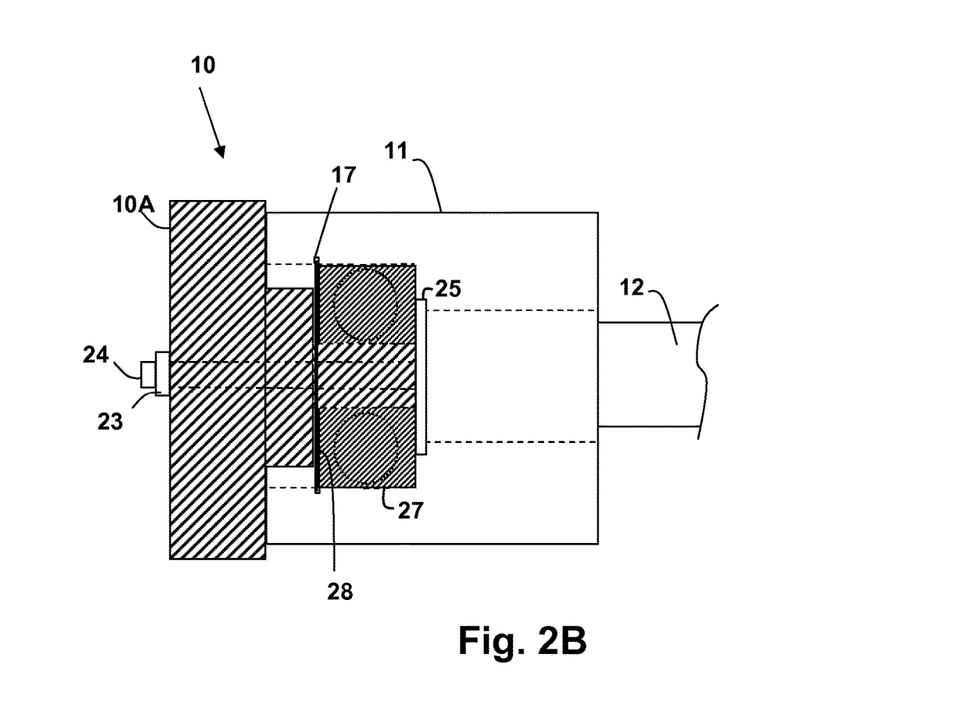

Referring now to FIG. 2B, the position of ball-bearing 21 within sleeve end 11 is shown after installation. A snap ring 28 has been installed in groove 17 to retain ball-bearing 21 within sleeve end 11 of layshaft 12. Flange portion 10A has then been secured to cap 25 by nut 23 tightened onto threaded stud 24. The depicted assembly is a stock bearing installation provided for illustrating the distinctions of a replacement bearing assembly 20 installation as described in further detail below.

Figure 3:
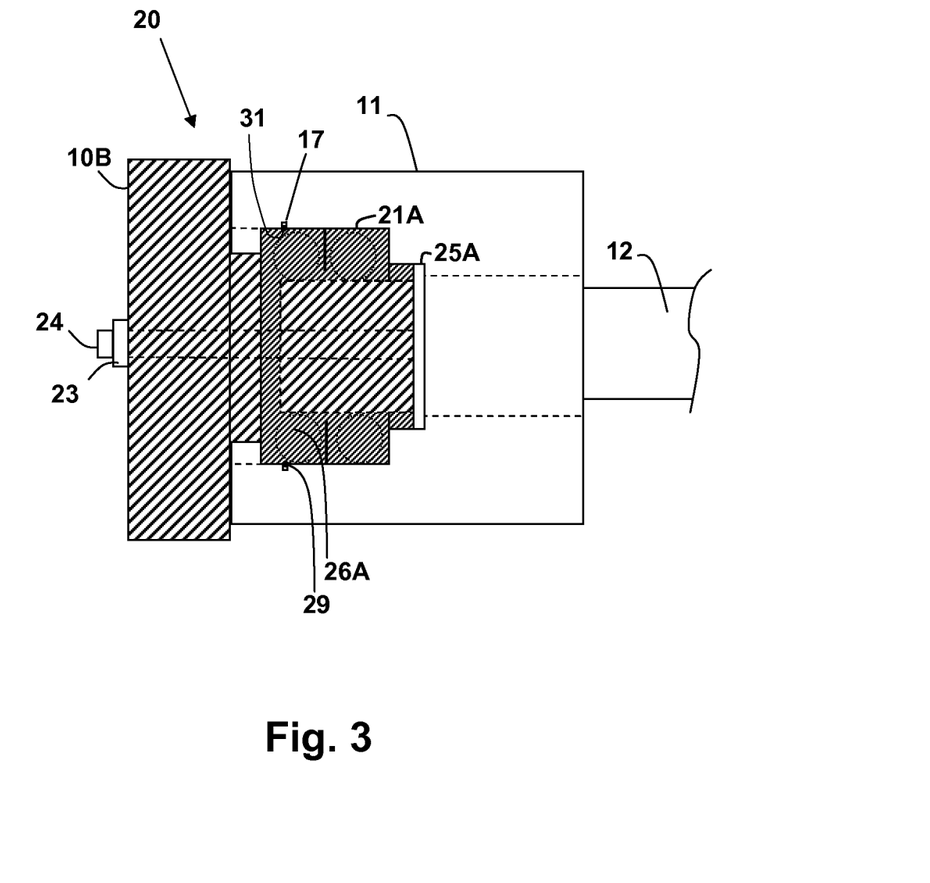
FIG. 3 is side cross-section view of an oversized bearing 20 in accordance with an embodiment of the invention.

Referring now to FIG. 3, a bearing retrofit in accordance with an embodiment of the invention is shown. In the retrofit, replacement bearing assembly 20 is installed, and includes a flange portion 10B, a ball-bearing 21A including balls 26A, a cap 25A, threaded stud 24 and nut 23, similar to the stock bearing 10 shown in FIGS. 2A-2B, but having a greater length that permits a dual-row configuration for ball-bearing 21A or use of other bearing technologies including roller or plain bearings. Balls 26A may differ from balls 26 in that they are preferably ceramic and may have a different diameter or count. The length of ball bearing 21A is such that ball bearing 21A, i.e., the captive portion of replacement bearing assembly, cannot be retained using snap ring 28 as with stock bearing 10, but instead, an internal wire lock 29 is installed to provide a retaining component to retain ball bearing 21A within sleeve end 11. Wire lock 29 fits partially within a groove 31 machined around a circumference of ball bearing 21A, so that ball bearing 21A provides a mating channel for wire lock 29, and partially within the inner end of groove 17. Wire lock 29 has a split, so that a small gap is formed between ends of wire lock 29 when installed, allowing wire lock 29 to be easily mounted in the groove machined around ball-bearing 21A. Groove 17 was made to receive snap ring 28 and so the diameter, material and length of wire lock 29 is carefully chosen to ensure that wire lock 29 remains within the groove machined around the circumference of ball-bearing 21A. In the examples given above, the length of the single-row stock ball-bearing 21 and thus the distance from the back end of ball-bearing 21A to groove 31 is approximately 14 mm, while the entire length of ball-bearing 21A is approximately 18 mm. Some factory engine models include a dual-row ball-bearing that is 23.75 mm in length, which is retained with an internal wire lock, but the outside of sleeve end 11 is chamfered to ease installation of such bearings, i.e., the engine and its components are designed for such an installation. The diameter of wire lock 29 is approximately 1.07 mm,. the diameter of groove 31 is approximately 1.22 mm, while groove 17 is approximately 2.0 mm in width and 1.4 mm in depth.

Figure 4A:
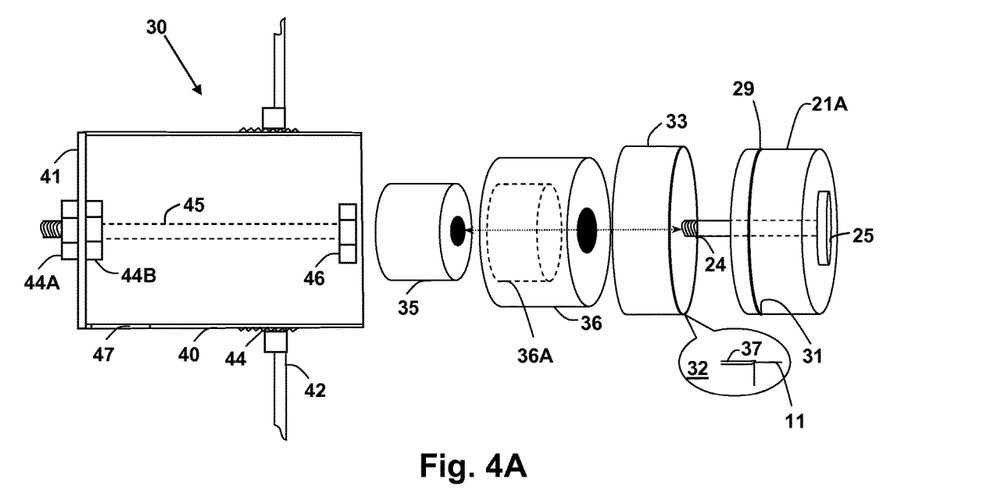
FIG. 4A is a pictorial diagram showing a side cross-section view of a bearing installation tool 30 and an exploded view of bearing 20 in accordance with an embodiment of the invention.
Figure 4B:
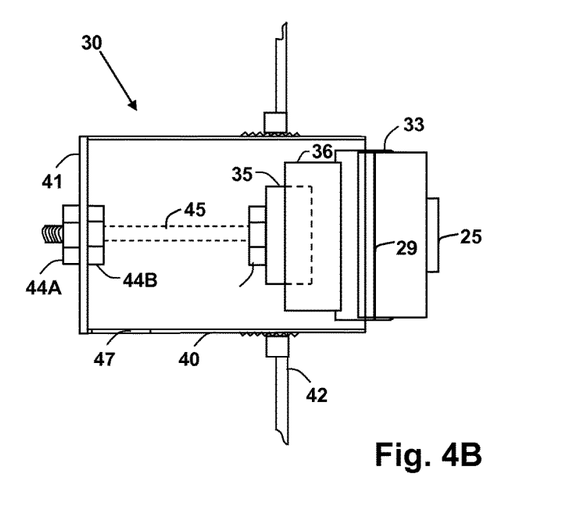
FIG. 4B is pictorial diagram showing a side cross-section view of a bearing installation tool 30 and bearing 20 in accordance with an embodiment of the invention.

Referring now to FIGS. 4A-4B, a bearing installation tool 30 for installing replacement bearing assembly 20 is shown. Bearing installation tool 30 has a flange 42 having a hole pattern matched to the design of the engine block design, so that at least a few bolt locations of an engine block line will up with holes through flange 42 so that flange 42 can be secured to the engine while bearing assembly 20 is installed. As illustrated in FIG. 2A, and as illustrated in callout 32, the face of sleeve end 11 is not chamfered because sleeve end 11 is not designed to accept a bearing with an exterior wire lock such as replacement bearing assembly 20, but rather stock ball-bearing 21 that is easily inserted and retained with snap ring 28. Therefore, bearing installation tool 30 is used to insert ball-bearing 21A pre-assembled with wire lock 29 installed in the exterior groove 31 of ball-bearing 21A, within a tool body 40 of bearing installation tool 30. Exterior groove 31 is preferably semicircular in cross-section, but may alternatively be rectangular and extends around the entire circumference of ball-bearing 21A. Tool body 40 has exterior threads 48 that mate with thread provided through a matching aperture through flange 42. Ball-bearing 21A and wire lock 29, previously assembled together, are pressed into a tapered sleeve 33 so that wire lock 29 is tightly secured around ball-bearing 21A. Tapered sleeve 33 is tapered to include a reverse-chamfered edge 37 (shown in a callout 32) that contacts the inside (non-chamfered) diameter of sleeve end 11, so that tapered sleeve 33 is adapted for mating with the inside diameter of sleeve end 11, and so that when bearing 21A is pressed out of tapered sleeve 33 by a bearing pusher 36 and into sleeve end 11, wire lock 29 stays in place around exterior groove 31 and the ends of wire lock 29 stay in their proper locations without being undesirably distorted within snap ring groove 17 within sleeve end 11. A thrust bearing 35 fits within a recess 36A formed within bearing pusher 36, preventing ball-bearing 21A, tapered sleeve 33 and bearing pusher 36 from rotating when a nut 44B is rotated to rotate shaft 45, extending or retracting bearing pusher 36 and the bearing assembly. Without thrust bearing 35, friction between bearing pusher 36 and tapered sleeve 33 will cause rotation of the bearing assembly during insertion, providing the potential for an end of wire lock 29 to be forced out of position within groove 17. For extraction of the original bearing, tapered sleeve 33 can be rotated 180°, which will prevent damage to chamfered end 37 of tapered sleeve 33.

Figure 5:
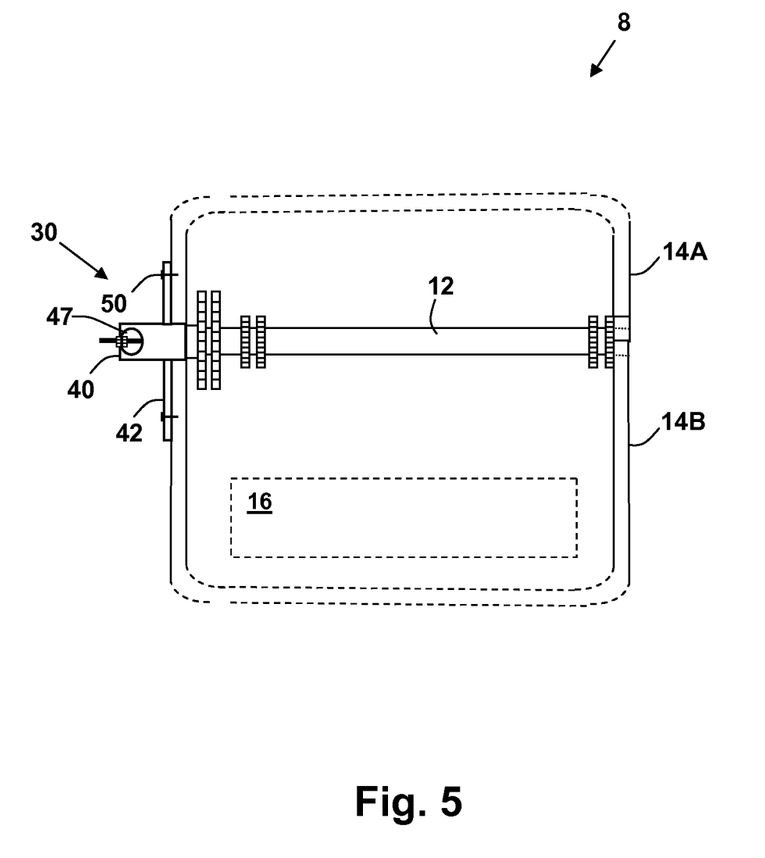
FIG. 5 is a top view of engine 8 showing a location of a bearing installation tool 30 during installation of bearing 20 in accordance with an embodiment of the invention.

Bearing installation tool 30 is shown assembled in FIG. 4B in preparation for installation of replacement bearing assembly 20 as shown in FIG. 3. Once second dowel 35 is inserted in recess 36A of bearing pusher 36 and ball-bearing 21A with wire lock 29 are pressed into tapered sleeve 33, so that wire lock 29 is compressed by the inside surface of tapered sleeve 33, cap 25 is passed through ball-bearing 21A, bearing pusher 36 and thrust bearing 35 and threaded into a female threaded end 46 of a shaft 45 that is used to move the tool and bearing assembly forward or alternatively retract, after installation of replacement bearing assembly 20 or according to other functions illustrated below. Referring additionally to FIG. 5, a flange 42 of bearing installation tool 30 is bolted to the face of engine block 8 with bolts 50. An internal face nut 44B is turned against a back plate 41 of bearing installation tool 30 at the end of tool body 40, causing threaded end 46, thrust bearing 35, bearing pusher 36 and tapered sleeve 33 to move forward and ball-bearing 21A to be pressed into sleeve end 11 until wire lock 29 snaps into groove 17, which is generally audible. An aperture 47 through tool body 47 is provided to permit insertion of a wrench to turn internal nut 44B. After installation, a back nut 44A is loosened, and flange 42 is unbolted from engine block, so that threaded end 46 can be detached from threaded stud 24 and flange portion 10B of the replacement bearing 20 can be installed. The threads 48 of tool body 40 that engage with threads of flange 42 provide that the projection of tool body 40 into the engine block, and thus the depth of extension of the end of tool body 40 around sleeve end 11 can be adjusted, in particular for performing the alternative operations detailed below with respect to the additional components illustrated in FIGS. 6A-6B.

Figure 6A:
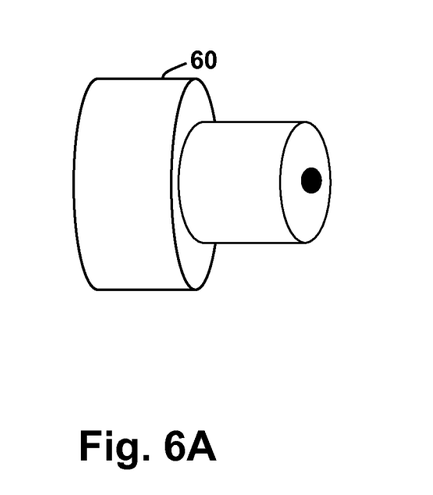
FIGS. 6A-6B are illustrations of a sleeve 60 and a dowel 62 that can be used with bearing installation tool 30 of FIGS. 4A-4B to install other types of bearings.

Referring now to FIG. 6A, an additional bearing pusher 60 that can be provided as part of a kit along with bearing installation tool 30, tapered sleeve 33, thrust bearing 35 and bearing pusher 36 is shown. Bearing pusher 60 is used in place of tapered sleeve 33, thrust bearing 35 and bearing pusher 36 to install the captive bushing of the replacement bearing shown in U.S. patent application Ser. No. 13/826, 941 entitled "LAYSHAFT END BEARING RETROFIT WITH EXTERNAL POSITIVE OIL PRESSURE DELIVERY" as filed on Mar. 14, 2013, the disclosure of which is incorporated herein by reference. Cap 25 of FIGS. 4A-4B in the above-incorporated U.S. patent application can be passed through the bushing 27 shown in FIGS. 4A-4B in the above-incorporated U.S. patent application and through the recess in bearing pusher 60, which has a profile that matches the flange portion 10 FIGS. 4A-4B in the above-incorporated U.S. patent application, permitting bearing installation tool 30 to be used to insert the retrofit bearings disclosed in the above-incorporated U.S. patent application.

Figure 6B:
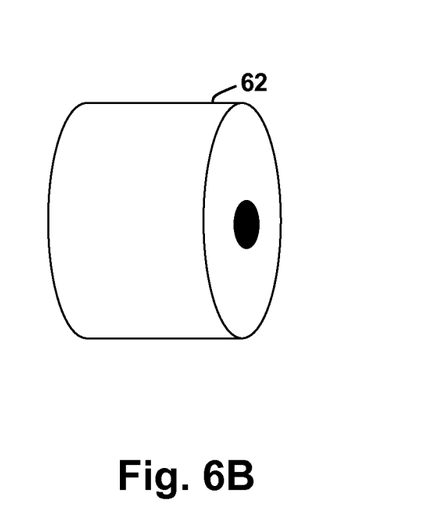

Referring now to FIG. 6B, an bearing pusher 62 that can be provided as part of a kit along with bearing installation tool 30, tapered sleeve 33, thrust bearing 35 and bearing pusher 36 is shown. Bearing pusher 62 is used in place of tapered sleeve 33, thrust bearing 35 and bearing pusher 36, to install ball-bearing 21 as shown in FIGS. 2A-2B above, or another replacement bearing having the same form factor. Bearing pusher 62 is used to insert ball-bearing 21 and cap 25 and tapered sleeve 33 is not required for such installation, since snap ring 28 is used to retain ball-bearing 21.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of retrofit installation of a first engine component having a captive portion, the method comprising:

assembling the captive portion of the first engine component of an engine and a retaining component within a tool body of a retro-fit tool, wherein the retaining component is engaged with a first mating channel of the captive portion of the first engine component, and compressed by an inside surface of a tapered sleeve of the retro-fit tool that is fit over the outside diameter of the captive portion of the first engine component and the retaining component, wherein the tapered sleeve is disposed within the tool body and has a diameter adapted for mating with an inside diameter of an end of a second engine component;

bolting a flange of the retro-fit tool having a hole pattern matching at least a portion of the hole pattern of an engine block of the engine to the engine block, wherein the tool body is located over or in a recess in the engine block that receives the captive portion of the engine component; and extending the captive portion of the first engine component and retaining component through the recess in the engine block into a second engine component that receives the captive portion of the first engine component to complete the retrofit installation, wherein the retaining component expands to engage a second mating channel of the second engine component to retain the captive portion of the first engine component within the engine.

2. The method of claim 1, wherein the first engine component is a bearing, wherein the second engine component is an engine shaft, and wherein the retaining component is a wire lock.

3. The method of claim 1, wherein the tool body of the retro-fit tool is a hollow cylindrical body having a threaded first end with a diameter less than an inside diameter of the recess in the engine block, wherein the flange of the retro-fit tool has a threaded opening for receiving the threaded first end of the tool body, and wherein the extending comprises rotating the tool body to extend the threaded first end of the tool body into the recess.

4. The method of claim 3, wherein the retro-fit tool further comprises a back-plate secured at a second end of the tool body and including a hole, a threaded stud having a first end inserted through the hole, a bearing pusher disposed at a second end of the threaded stud, and a nut threaded on the threaded stud against an inside surface of the back-plate, wherein the extending further comprises rotating the nut to extend the captive portion of the first engine component and the retaining component into the second engine component.

5. The method of claim 4, wherein the tapered sleeve terminates in a reverse-chamfered edge for contacting an end of the second engine component during the extending, where an inside diameter of the end of the second engine component is contacted by the chamfer of the reverse-chamfered edge so that when the retaining component exits the tool body during the extending, the retaining component does not expand beyond the inside diameter of the second engine component until the retaining component engages with the second mating channel of the second engine component.

6. The method of claim 4, further comprising, subsequent to the extending, disengaging the captive portion of the first engine component by rotating the threaded stud to withdraw the bearing pusher into the tool body, wherein the engagement of the retaining component with the second mating channel of the second engine component prevents the captive portion of the first engine component from being withdrawn with the bearing pusher.

7. The method of claim 4, further comprising, rotating the tool body to withdraw the tool body from the recess in the engine block.

8. The method of claim 4, wherein the assembling comprises rotating the threaded stud to withdraw the captive portion of the first engine component and the retaining component into the tool body.

9. The method of claim 4, further comprising providing a thrust bearing disposed between the bearing pusher and the captive portion of the first engine component, wherein the thrust bearing rotates freely with respect to the bearing pusher to prevent rotation of the threaded stud from causing rotation of the captive portion of the first engine component during the extending.

10. The method of claim 1, wherein the second mating channel has a rectangular cross-section adapted for accepting a snap ring having a rectangular cross-section, and wherein the retaining component is a wire lock having a circular cross-section used to replace the snap ring in the retro-fit installation.

11. A tool for retrofit installation of a first engine component having a captive portion and a retaining component, the tool comprising:
 a flange having a hole pattern matching at least a portion of a hole pattern of an engine block design;
 a tool body coupled to the flange for accepting the captive portion of the first engine component when the captive portion of the first engine component is installed in the tool; and
 a tapered sleeve disposed within the tool body for compressing the retaining component when the captive portion of the first engine component is installed in the tool with the retaining component engaged with a first mating channel of the captive portion of the first engine component, wherein the tapered sleeve has a diameter adapted for mating with an inside diameter of an end of a second engine component that receives the captive portion of the first engine component and the retaining component, whereby the retaining component expands to engage a second mating channel of the second engine component as the captive portion of the first engine component is extended into the second engine component.

12. The tool of claim 11, wherein the first engine component is a bearing, wherein the second engine component is an engine shaft, and wherein the retaining component is a wire lock.

13. The tool of claim 11, wherein the tool body is a hollow cylindrical body.

14. The tool of claim 13, wherein the tool body has a threaded first end with a diameter less than an inside diameter of the recess in the engine block, wherein the flange of the retro-fit tool has a threaded opening for receiving the threaded first end of the tool body.

15. The tool of claim 13, further comprising:
 a back-plate secured at a second end of the tool body, wherein the back-plate includes a hole;
 a threaded stud having a first end inserted through the hole;
 a bearing pusher disposed at a second end of the threaded stud; and
 a nut threaded on the threaded stud against an inside surface of the back-plate, wherein when the threaded stud is rotated, the bearing pusher is moved along the length of the tool body.

16. The tool of claim 15, wherein the tapered sleeve terminates in a reverse-chamfered edge for contacting an end of the second engine component, where the inside diameter of the end of the second engine component is contacted by the chamfer of the reverse-chamfered edge so that when the retaining component exits the tool body during extension of the captive portion of the first engine component into the second engine component, the retaining component does not expand beyond the inside diameter of the second engine component until the retaining component engages with the second mating channel of the second engine component.

17. The tool of claim 15, wherein the bearing pusher has a recess within an end thereof facing the back plate, wherein the tool further comprises a thrust bearing having a second diameter such that the thrust bearing fits within the recess, wherein the thrust bearing rotates freely with respect to the bearing pusher when the threaded stud is rotated, whereby the captive portion of the first component is prevented from rotating during installation and the retaining component is prevented from disengaging from the first mating channel of the captive portion of the first engine component.

18. The tool of claim 11, wherein the second mating channel has a rectangular cross-section adapted for accepting a snap ring having a rectangular cross-section, and wherein the retaining component is a wire lock having a circular cross-section used to replace the snap ring in the retro-fit installation.

19. A tool for retrofit installation of an engine bearing having a captive portion and a wire lock, the tool comprising:
 a flange having a hole pattern matching at least a portion of a hole pattern of an engine block design;
 a tool body coupled to the flange for accepting the captive portion of the bearing when the captive portion of the bearing is installed in the tool;
 a tapered sleeve disposed within the tool body for compressing the wire lock when the captive portion of the engine bearing is installed in the tool with the wire lock engaged with a first mating channel of the captive portion of the engine bearing, wherein the tapered sleeve has a diameter adapted for mating with an inside diameter of a component of the engine that receives the captive portion of the engine bearing and the wire lock, whereby the wire lock expands to engage a second mating channel of the component of the engine as the captive portion of the bearing is inserted into the component of the engine;
 a back-plate secured at a second end of the tool body, wherein the back-plate includes a hole;
 a threaded stud having a first end inserted through the hole;
 a bearing pusher disposed at a second end of the threaded stud; and
 a nut threaded on the threaded stud against an inside surface of the back-plate, wherein when the threaded stud is rotated, the dowel is moved along the length of the tool body.

20. The tool of claim 19, wherein the tapered sleeve terminates in a reverse-chamfered edge for contacting an end of a the engine shaft during the extending, where the inside diameter of the engine shaft is contacted by the chamfer of the reverse-chamfered edge so that when the wire lock exits the tool body during extension of the captive portion of the engine bearing component into end of the engine shaft, the wire lock component does not expand beyond the inside diameter of the end of the engine shaft until the wire lock engages with a second mating channel within the end of the engine shaft.

* * * * *